(12) United States Patent
Codina Saborit et al.

(10) Patent No.: US 12,491,682 B2
(45) Date of Patent: Dec. 9, 2025

(54) HEATING DEVICES FOR THREE-DIMENSIONAL PRINTERS

(71) Applicant: Peridot Print LLC, Palo Alto, CA (US)

(72) Inventors: Arnau Codina Saborit, Sant Cugat del Valles (ES); Daniel Pablo Rosenblatt, Sant Cugat del Valles (ES); Ferran Esquius Berengueras, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 0 days.

(21) Appl. No.: 18/286,514

(22) PCT Filed: Jan. 21, 2022

(86) PCT No.: PCT/US2022/013282
§ 371 (c)(1),
(2) Date: Oct. 11, 2023

(87) PCT Pub. No.: WO2022/220901
PCT Pub. Date: Oct. 20, 2022

(65) Prior Publication Data
US 2024/0123685 A1 Apr. 18, 2024

(51) Int. Cl.
| | | |
|---|---|---|
| B29C 64/277 | (2017.01) | |
| B22F 12/40 | (2021.01) | |
| B28B 1/00 | (2006.01) | |
| B29C 64/171 | (2017.01) | |
| B29C 64/291 | (2017.01) | |
| B29C 64/393 | (2017.01) | |
| B33Y 10/00 | (2015.01) | |
| B33Y 30/00 | (2015.01) | |

(Continued)

(52) U.S. Cl.
CPC ............ *B29C 64/291* (2017.08); *B22F 12/40* (2021.01); *B28B 1/001* (2013.01); *B29C 64/171* (2017.08); *B29C 64/393* (2017.08); *B33Y 10/00* (2014.12); *B33Y 30/00* (2014.12); *B33Y 50/02* (2014.12); *B33Y 80/00* (2014.12); *B29C 64/165* (2017.08); *B29K 2075/00* (2013.01); *B29K 2077/00* (2013.01)

(58) Field of Classification Search
None
See application file for complete search history.

(56) References Cited

U.S. PATENT DOCUMENTS

| | | |
|---|---|---|
| 10,569,470 B2 | 2/2020 | Donovan et al. |
| 2018/0009171 A1 | 1/2018 | Donovan et al. |

(Continued)

FOREIGN PATENT DOCUMENTS

| | | |
|---|---|---|
| CN | 107509279 A | 12/2017 |
| EP | 3708341 A1 | 9/2020 |

(Continued)

*Primary Examiner* — Yung-Sheng M Tsui
(74) *Attorney, Agent, or Firm* — Shook, Hardy & Bacon

(57) ABSTRACT

According to an example, a heating device comprises a plurality of light emitting arrays to emit a respective irradiance associated with a calibration profile and a power source electrically connected to the plurality of light emitting arrays, wherein the irradiances emitted by the plurality of light emitting arrays result in a substantially spatially uniform irradiance towards a target surface.

12 Claims, 4 Drawing Sheets

(51) Int. Cl.
   *B33Y 50/02*   (2015.01)
   *B33Y 80/00*   (2015.01)
   *B29C 64/165*   (2017.01)
   *B29K 75/00*    (2006.01)
   *B29K 77/00*    (2006.01)

(56) References Cited

U.S. PATENT DOCUMENTS

| | | | |
|---|---|---|---|
| 2018/0326655 A1* | 11/2018 | Herzog | B22F 12/45 |
| 2018/0339449 A1 | 11/2018 | Chen | |
| 2019/0232564 A1* | 8/2019 | Pontiller-Schymura | B33Y 30/00 |
| 2019/0322049 A1 | 10/2019 | Kang et al. | |
| 2020/0122272 A1* | 4/2020 | Werner | B22F 12/90 |
| 2020/0221055 A1 | 7/2020 | Surana et al. | |
| 2020/0236759 A1 | 7/2020 | Jurik et al. | |
| 2020/0238605 A1 | 7/2020 | Mitomo et al. | |
| 2022/0402209 A1* | 12/2022 | Heymel | B29C 64/295 |
| 2023/0191694 A1 | 6/2023 | Dorini | |

FOREIGN PATENT DOCUMENTS

| | | |
|---|---|---|
| ES | 2759901 T3 | 5/2020 |
| MX | 2016016670 A | 6/2017 |
| RU | 2650155 C2 | 4/2018 |
| WO | 2014/187606 A1 | 11/2014 |
| WO | 2018/143956 A1 | 8/2018 |
| WO | 2019/125407 A1 | 6/2019 |
| WO | 2020/068075 A1 | 4/2020 |
| WO | 2020/153953 A1 | 7/2020 |
| WO | 2021/027295 A1 | 2/2021 |

\* cited by examiner

HEATING DEVICES FOR THREE-DIMENSIONAL PRINTERS

BACKGROUND

Three-dimensional printing systems generate three-dimensional (3D) objects through the solidification of a build material. In some examples, printing systems may use heating devices or heating elements to melt selected regions of the layered build material such that the build material is solidified on a layer-by-layer basis. In other examples, printing systems may use heating devices or elements to maintain a target surface such as a layer of build material under operative conditions (e.g., temperature or humidity) during the printing operation.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1A:
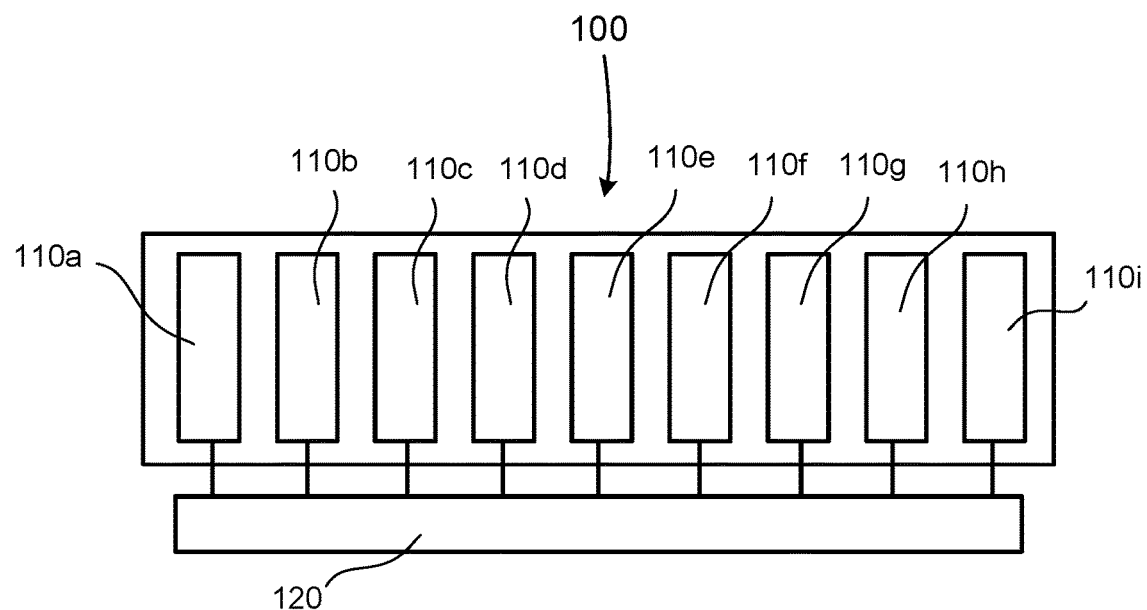
FIG. 1A shows a bottom view of a heating device comprising a plurality of light emitting arrays and a power source, according to an example of the present disclosure.

For simplicity and illustrative purposes, the present disclosure is described herein by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Additive manufacturing, or three-dimensional printing, systems may generate three-dimensional objects through the solidification of build material. In an example, the build material is a powder-like granular material, which may for example be a plastic, ceramic, or metal powder and the properties of generated objects may depend on the type of build material and the type of solidification mechanism used. Build material may be deposited, for example, on a build platform and processed layer by layer, for example within a process chamber of an additive manufacturing system. According to one example, a suitable build material may be PA12 build material commercially referred to as V1R10A "HP PA12" available from HP Inc. Other examples of build material comprise PA11 material, commercially referred to as V1R12A "HP PA11", Thermoplastic Polyurethane (TPU) materials, Thermoplastic Polyamide materials (TPA), and the like.

According to one example, a suitable fusing agent may be an ink-type formulation comprising carbon black, such as, for example, the fusing agent formulation commercially referred to as V1Q60A "HP fusing agent" available from HP Inc. Such a fusing agent may comprise any of or any combination of an infra-red light absorber, a near infra-red light absorber, a visible light absorber and a UV light absorber. Examples of fusing agents comprising visible light absorption enhancers are dye-based colored ink and pigment-based colored ink, such as inks commercially referred to as CE039A and CE042A available from HP Inc.

In some examples, a fusing agent may be selectively distributed onto portions of a layer of build material in a pattern derived from data representing a slice of a three-dimensional object to be generated (which may, for example, be determined from structural design data). The fusing agent may have a composition that absorbs energy such that when energy (for example, heat) is applied to the layer, the build material to which it has been applied heats up, coalesces, and solidifies, upon cooling, to form a layer of the three-dimensional object in accordance with the pattern. In other examples, coalescence may be achieved in some other manner.

In some examples, in addition to a fusing agent, a print agent may comprise a detailing agent, which acts to modify the effects of a fusing agent for example by reducing or increasing coalescence or to assist in producing a particular finish or appearance of an object. In some examples, a detailing agent may be used near edge surfaces of an object being printed to reduce thermal bleed. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

According to some examples, an additive manufacturing system may comprise a plurality of fusing energy modules for melting the build material of a powder bed. In an example, the plurality of fusing energy modules may be heat lamps such as infrared heat lamps. In another example, the fusing energy modules may be arrays of light emitting diodes (LEDs). In some examples, the plurality of fusing energy modules may comprise a large number, for example, hundreds or several thousand, of LEDs nominally separated into the light emitting arrays, each of which is separately controlled.

In some examples, the energy emitted by a light emitting array towards a region may impact neighboring regions. Also, environmental effects within the printer may cause that some regions tend to be cooler than other regions. Furthermore, "re-radiation effects", which result from a portion of the energy which is reflected from a target surface rather than being absorbed, may differ depending on the material of the target surface. In an example, when the target surface is a print bed, the "re-radiation" may be based on the shape and disposition of the objects being generated in a given layer, the type of fusing agent, the arrangement of these objects, and the like.

In some examples, a heating device may be controlled to emit an equal irradiance value towards a target surface. However, as previously explained, external factors to the heating device (such as environmental conditions or "re-radiation effects") and internal factors of the heating device (such as relative locations of the light emitting array within the heating device or the arrangement of the heating elements) may result in the emission of a non-uniform irradiance value towards the target surface (e. g., a powder bed). Such non-uniform irradiance received by the target surface may result in temperature differences along the print bed. Among other consequences, non-uniform irradiance values may negatively impact physical properties of the three-dimensional generated object(s) such as the weight of the object, the density of the object, the shape of the object, the dimensions of the object, or mechanical properties such as the stiffness or the hardness.

Therefore, to enhance the reliability and reproducibility of the heating operations, the irradiance value received by the target surface should be as uniform as possible.

In the following, examples of heating devices comprising light emitting arrays for uniform irradiance of target surfaces will be described. Accordingly, examples of printing systems including such heating devices are also described.

Throughout the description, the term "irradiance" will be used to refer to the radiant flux (power) received by a surface per unit of area. Similarly, the term "irradiance profile" will be used to refer to the irradiance values received along a line that intersects a target surface.

Referring now to FIG. 1A, a bottom view of a heating device 100 is shown. The heating device 100 may be used for emitting a substantially spatially uniform irradiance over a target surface. The heating device 100 comprises a plurality of light emitting arrays 110a to 110i arranged along the heating device 100, and a power source 120 electrically connected to the plurality of light emitting arrays 110a to 110i. In FIG. 1A, the power source 120 of the heating device 100 selectively supplies a respective electric current to each light emitting array.

Each of the light emitting arrays is associated with a region of the target surface. However, since each light emitting array has at least one neighboring array, the irradiance emitted by the light emitting array or each neighboring array may impact the irradiance received by the target surface. As a result, the irradiances emitted by the arrays may contribute differently to the overall irradiance received by the target surface. In addition, other external factors may impact the irradiance received by the target surface. To balance the above-mentioned factors, the power source 120 supplies each light emitting array with an electric current that causes the light emitting array to emit a respective irradiance associated with a calibration profile.

In some examples, the calibration profile may balance internal factors which affect the non-uniformity of the heating device 100. In particular, the calibration profile may quantify a contribution of an irradiance emitted by a light emitting array to the overall irradiance received by the target surface. For example, to emit a uniform irradiance with the plurality of light emitting arrays 110a to 110i of FIG. 1A towards a target surface, the calibration profile may cause the light emitting array 110a and 110i (i.e., the arrays located at the edges of the heating device 100) to emit a greater irradiance than the irradiance emitted by the light emitting arrays 110d, 110e, and 110f (i.e., the arrays located at the center of the heating device 100). In some other examples, the calibration profile may also balance external factors which affect the non-uniformity of the heating device. In this way, when using a heating element to emit irradiance towards a target surface, the electric current supplied by the power source 120 to each of the light emitting arrays may be based on internal factors and external factors.

According to an example, a calibration profile may define energy levels for the plurality of light emitting arrays. For example, the energy levels may be in the form of a percentage of an output value with respect to a maximum energy output value. Different energy levels may be provided by selectively controlling the light emitting arrays to output energy according to a predetermined energy distribution pattern. In some examples, the power supplied to the light emitting arrays may be controlled using pulse width modulation techniques, or by varying the absolute level of power supplied. In other examples, a voltage or current may be controlled to adjust the output power of a light emitting array, or the output power may be adjusted in some other suitable way.

According to some examples, the impact of each light emitting array of a heating device on each zone of the target surface depends on the layout of the light emitting arrays. In an example described below, the light emitting arrays are formed as strips of LEDs, which together span a target surface such as a print bed in one dimension, and which are scanned over the print bed in a direction orthogonal to the strip. In this example, there are 12 such strips, each indexed 1 to 12 in the table below. In such an example, a matrix of energy contributions may be determined as follows (where empty cells indicate no substantial energy contribution):

TABLE 1

| | | Light emitting arrays | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Zones | 1 | 0.504 | 0.227 | 0.021 | | | | | | | | | |
| | 2 | 0.227 | 0.504 | 0.227 | 0.021 | | | | | | | | |
| | 3 | 0.021 | 0.227 | 0.504 | 0.227 | 0.021 | | | | | | | |
| | 4 | | 0.021 | 0.227 | 0.504 | 0.227 | 0.021 | | | | | | |
| | 5 | | | 0.021 | 0.227 | 0.504 | 0.227 | 0.021 | | | | | |
| | 6 | | | | 0.021 | 0.227 | 0.504 | 0.227 | 0.021 | | | | |
| | 7 | | | | | 0.021 | 0.227 | 0.504 | 0.227 | 0.021 | | | |
| | 8 | | | | | | 0.021 | 0.227 | 0.504 | 0.227 | 0.021 | | |
| | 9 | | | | | | | 0.021 | 0.227 | 0.504 | 0.227 | 0.021 | |
| | 10 | | | | | | | | 0.021 | 0.227 | 0.504 | 0.227 | 0.021 |
| | 11 | | | | | | | | | 0.021 | 0.227 | 0.504 | 0.227 |
| | 12 | | | | | | | | | | 0.021 | 0.227 | 0.504 |

In other words, in this example, a given light emitting array provides around half of its energy to an associated zone of the target surface. In some examples, the target surfaces that have a similar footprint to an associated light emitting array are provided directly below the light emitting array. In a particular example described herein, each light emitting array extends across the width of the zone in one dimension but is swept through that zone in the other dimension. In use, the light emitting array may be swept across the zone to provide an effective footprint which corresponds to the footprint of the zone, and the above matrix may represent how energy is provided to the target surface in total as the light emitting array is moved. In other examples, a light emitting array may be a different shape and/or may have its output directed by optical components such as lenses, mirrors or the like such that the energy is incident on a given region of the bed.

It will be appreciated that the calibration profile defined by the energy distribution matrix may vary, in some examples significantly, from that set out in Table 1, based on the arrangement of light emitting arrays. For example, rather than being strips that are scanned across the target surface, the light emitting arrays provided may be statically positioned above the target surface, for example in a two-dimensional array. In addition, in some examples, light emitting arrays may vary in shape from one another. Moreover, some light emitting arrays may provide energy with a different area distribution (for example, in a manner that is more defused, or more focused) than other light emitting arrays. However, for a given arrangement of light emitting arrays, an energy distribution matrix such as the one in the table shown above may be determined by measurement and/or based on modeling of energy distribution.

In some examples, zones 1 and 12 represent an extended print bed of an additive manufacturing system. In other words, object generation may be generally carried out in zones 2 to 11 as the edges of the bed may be associated with greater variability in temperature. However, in principle, object generation may be carried out in zones 1 to 12 in some examples.

Figure 1B:
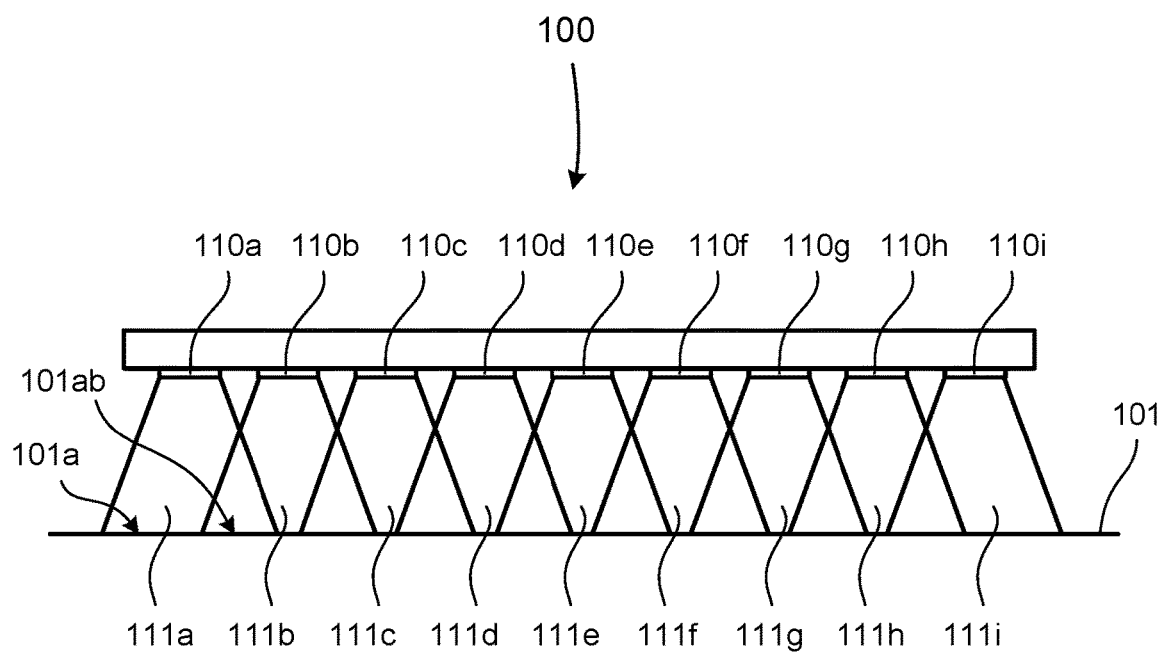
FIG. 1B shows a side view of the heating device of FIG. 1A.

Referring now to FIG. 1B, a side view of the heating device 100 of FIG. 1A is shown. The heating device 100 comprises the plurality of light emitting arrays 110*a* to 110*i* and a power source (not shown in FIG. 1B) electrically connected to the plurality of light emitting array 110*a* to 110*i*. The plurality of light emitting arrays 110*a* to 110*i* is to emit irradiance towards a target surface 101.

In FIG. 1B, each light emitting array emits a respective irradiance. As previously explained, the respective irradiances emitted by the light emitting arrays 110*a* to 110*i* may be associated with a calibration profile. For instance, in FIG. 1B, a first light emitting array 110*a* emits an irradiance 111*a* towards a region 101*a* of the target surface 101 and a second light emitting array 110*b* emits an irradiance 111*b* towards a different region. However, as previously explained, an irradiance emitted by a light emitting array towards a region may affect neighboring regions. In FIG. 1B, the irradiance emitted by the second light emitting array 110*b* reaches the region 101*a* of the target surface 101, thereby resulting in a first overlap region 101*a*.

To emit a uniform irradiance towards the target surface 101 with the plurality of light emitting arrays 110*a* to 110*i*, the power source selectively supplies to each light emitting array a respective electric current. In an example, the respective electric currents may be based on the respective irradiance to be emitted by the light emitting array. For instance, in the heating device 100, the power source supplies to each of the first light emitting array 110*a* and the second light emitting array 110*b* a respective electric current associated with the respective irradiance associated with the calibration profile. For instance, following with the example of Table 1, zone 1 (which may correspond to region 101*a* of the target surface 101) will receive irradiance from the first light emitting array 110*a*, the second light emitting array 110*b*, and the third light emitting array 110*c*.

As previously explained, the light emitting arrays 110*a* to 110*i* comprise light emitting modules. In particular, each of the light emitting arrays 110*a* to 110*i* comprises a respective number of light emitting modules. In some examples, the irradiance emitted by the light emitting array may be based on a number of light emitting modules of the light emitting array. In addition, in some examples, the number of light emitting modules of a light emitting array may be arranged in a set of parallel strings having a common voltage drop.

According to an example, the respective number of light emitting modules is arranged such that the power source supplies a uniform electric current to the light emitting modules. In an example, the light emitting modules may be light emitting diodes and the light emitting diodes are arranged such that the power source supplies to the light emitting diodes a uniform operative electric current. For instance, the uniform operative electric current may correspond to an electric current in which the thermal losses of the light emitting diodes are reduced while emitting an admissible level of output power with the light emitting diodes.

According to other examples, for each light emitting array, the respective number of light emitting modules is arranged such that the power source supplies a uniform electric current to the respective number of light emitting modules, and a respective series of resistors are arranged in each light emitting array such that each light emitting array has an array common voltage drop value.

In some examples, the light emitting modules of each of the light emitting arrays may be arranged such that the electric current supplied by the power source splits so that the light emitting modules are each driven with equal electric current. When driving the light emitting modules at an equal electric current, degradation of the light emitting modules will occur uniformly, and thus, the negative impacts of the degradation (such as reduced efficiency or output power decrease) will uniformly impact all the light emitting modules forming the heating device. Otherwise, degradation of the light emitting modules may not be uniform, and therefore, the non-uniformity of the irradiances emitted by each of the light emitting arrays will be increased. As explained above, the non-uniformity of the irradiances will lead to thermal differences along the target surface.

Figure 2A:
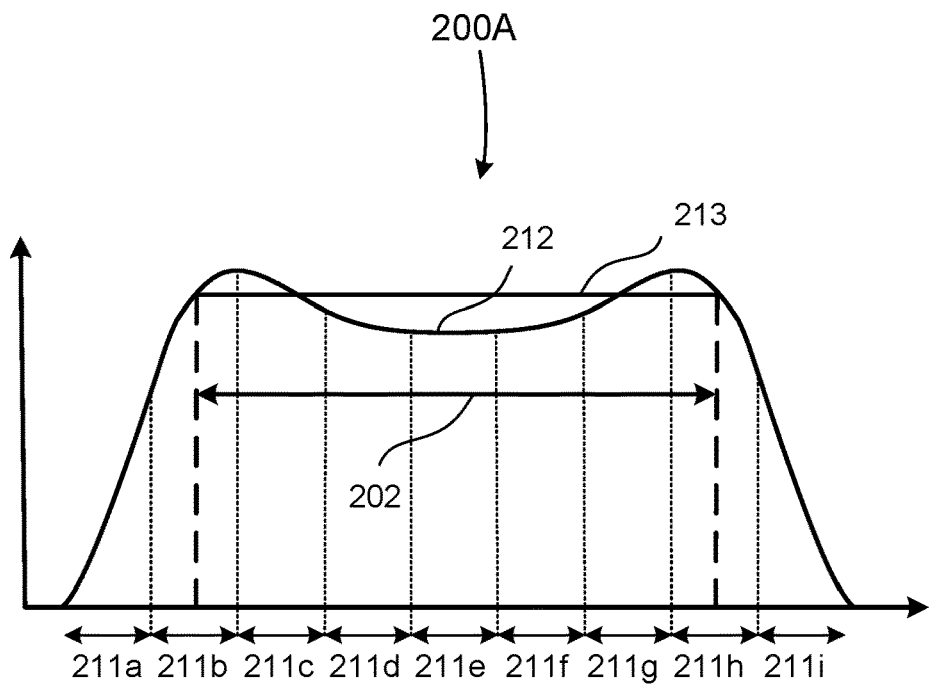
FIG. 2A shows a chart representing an irradiance emitted by a plurality of light emitting arrays towards a target surface, according to an example of the present disclosure.

Referring now to FIG. 2A, a chart 200A representing irradiance 212 emitted by a plurality of light emitting arrays 211*a* to 211*i* towards a target surface 202 is shown. The Y-axis of the chart 200A corresponds to a value of the irradiance 212 and the X-axis represents the light emitting arrays distributed along a distance (e.g., a distance that spans a target surface). As previously explained, each of the light emitting arrays 211*a* to 211*i* is controlled to emit an irradiance towards a respective portion of the distance. However, a region associated with a light emitting array may be irradiated by neighboring light emitting arrays. Similarly, other factors such as "re-radiation effects" and environmental conditions may have an impact on irradiance received by the target surface 202. Therefore, it should be understood that the irradiance 212 does not represent the individual irradiances emitted by the light emitting arrays 211a to 211i but the overall irradiance to be emitted by the light emitting arrays 211a to 211i to emit a spatially uniform irradiance 213 along a target surface 202. In some examples, the irradiances emitted by the light emitting arrays 211a to 211i may be based on a calibration profile. Thus, although the overall irradiance 212 emitted by the light emitting arrays 211a to 211i is non-uniform, the emitted irradiance results in a substantially spatially uniform irradiance 213 towards the target surface 202.

Figure 2B:
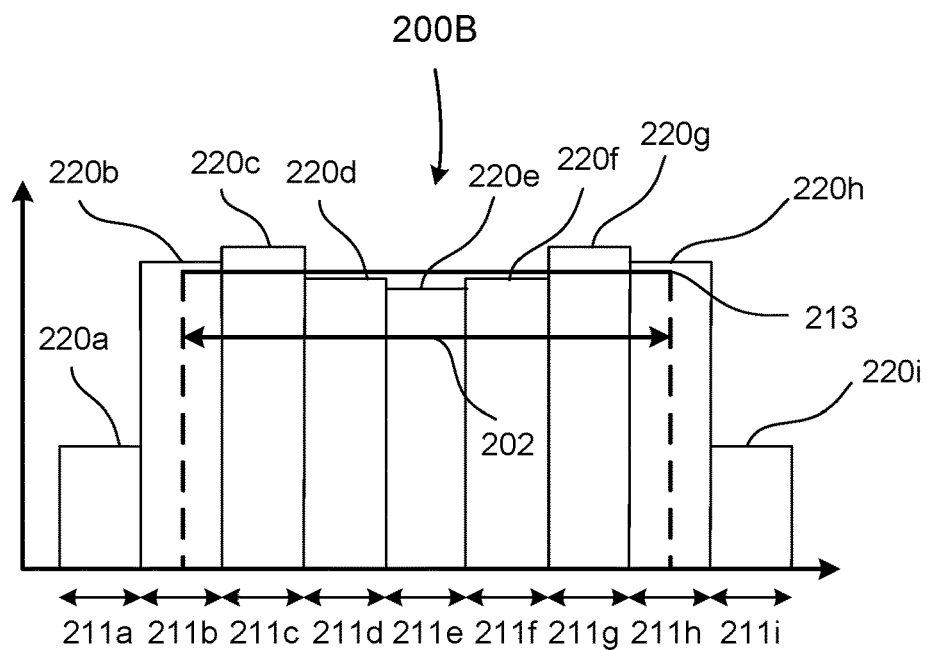
FIG. 2B shows a chart representing energy levels for the plurality of light emitting arrays of FIG. 2A.

Referring now to FIG. 2B, a chart 200B representing energy levels 220a to 220i for the plurality of light emitting arrays 211a to 211i of FIG. 2A is shown. The energy levels 220a to 220i may correspond to the input energy levels supplied by a power source. In particular, the energy levels represented in chart 200B correspond to energy levels associated with the irradiance 212 emitted by the plurality of light emitting arrays 211a to 211i previously explained in reference to FIG. 2A. In an example, the irradiance 212 emitted by each light emitting array is a function of the respective energy level and a respective light emitting array efficiency.

To effectively obtain the energy levels 220a to 220i for each of the light emitting arrays 211a to 211, the power source of the heating device supplies the plurality of light emitting arrays 211a to 211i with a respective voltage value and/or respective electric current. In an example, the power source selectively supplies a respective electric current to each light emitting array, wherein the respective electric current is based on the energy level for the light emitting array. For example, the power source may supply a first energy level 220a to the first light emitting array 211a, a second energy level 220b to the second light emitting array 211b, a third energy level 220c to the third light emitting array 211c, and so on. As a result of the energy levels 220a to 220i, the plurality of light emitting arrays 211a to 211i emits a non-uniform irradiance 212 that results in a uniform irradiance 213 towards the target surface 202 (i.e., the target surface 202 receives the spatially uniform irradiance 213).

In an example, the energy levels 220a to 220i for each of the light emitting arrays 211a to 211i may be determined based on the calibration profile and the spatially uniform irradiance to be emitted towards by the target surface 202. In particular, based on the spatially uniform irradiance 213 and the calibration profile, the respective irradiances to be emitted by the plurality of light emitting arrays 211a to 211i (and hence, energy levels supplied by the power source to the plurality of light emitting arrays 211a to 211i) may be determined.

In some examples, the calibration profile may be based on a number of light emitting arrays within the plurality of light emitting arrays and the substantially uniform irradiance to be emitted by the plurality of light emitting arrays towards the target surface. In some other examples, the calibration profile may be based on an arrangement of the number of light emitting arrays. In other examples, the calibration profile may be based on the number of light emitting arrays, the substantially uniform irradiance to be emitted by the light emitting arrays, and the arrangement of the number light emitting arrays. In some other examples, the calibration profile may also balance external factors.

Figure 3:
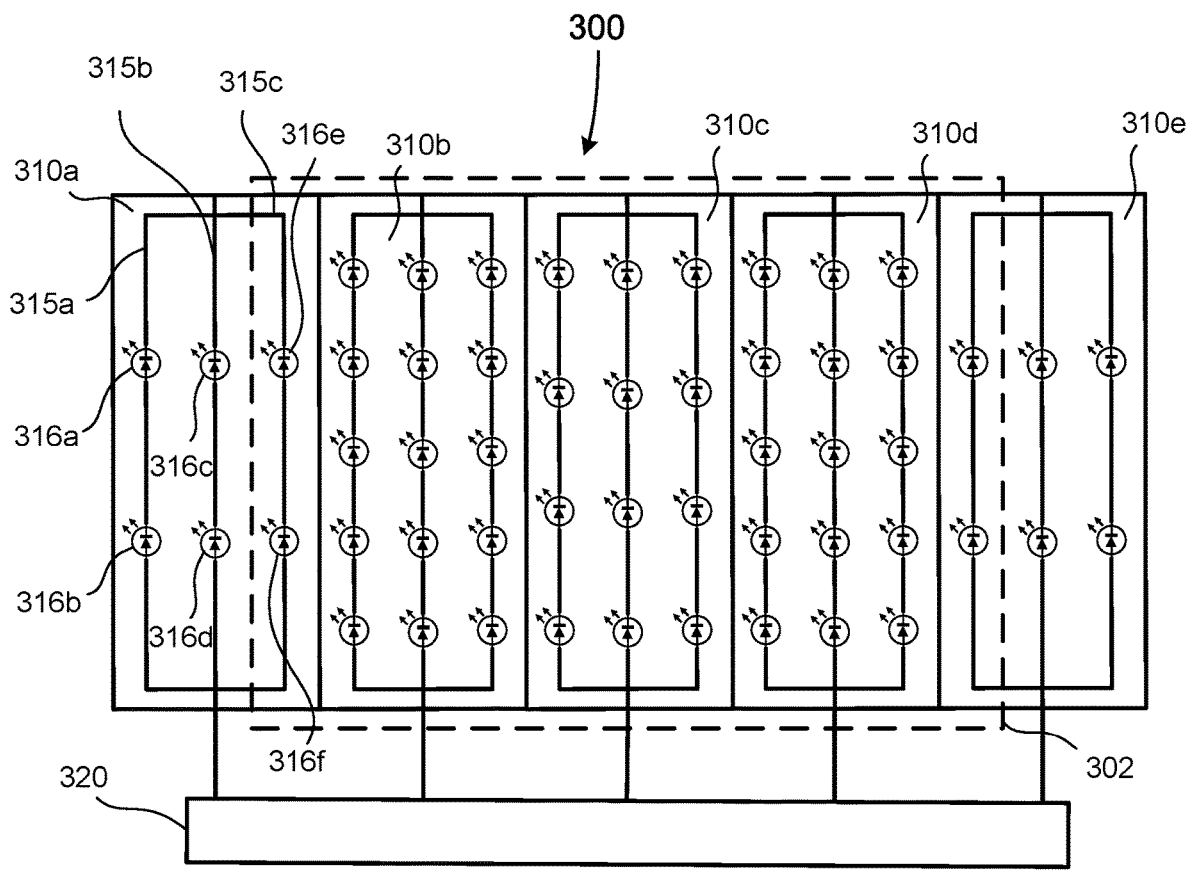
FIG. 3 shows a heating device comprising a plurality of light emitting arrays comprising electrically connected to a power source, according to an example of the present disclosure.

Referring now to FIG. 3, a heating device 300 comprising a plurality of light emitting arrays 310a to 310e electrically connected to a power source 320 is shown. The light emitting arrays 310a to 310e comprise light emitting modules for irradiating a target surface 302 (indicated in dashed lines). In each of the light emitting arrays, the light emitting modules are arranged in parallel lines having a common voltage drop. In this way, when the power source 320 supplies an electric current to one of the light emitting arrays 310a to 310e, the light emitting modules belonging to the respective light emitting array are driven at a uniform electric current. As previously explained, to emit a uniform irradiance value towards the target surface 302, the power source 320 supplies the light emitting arrays 310a to 310e with a respective electric current such that the light emitting arrays 310a to 310e emit a respective array irradiance associated with a calibration profile. Such respective array irradiance results from the irradiances emitted by the light emitting modules belonging to the same light emitting array. Therefore, in some examples, the light emitting arrays 310a to 310e may include a non-uniform number of light emitting modules associated with the respective array irradiances.

In FIG. 3, the first and the fifth light emitting arrays 310a and 310e comprise six light emitting modules, the second and the fourth light emitting arrays 310b and 310d comprise fifteen light emitting modules, and the third light emitting array 310c comprises twelve light emitting modules. In particular, the first light emitting array 310a of the heating device 300 comprises a first light emitting module 316a and a second light emitting module 316b in a first parallel string 315a, a third light emitting module 316c and a fourth light emitting module 316d in a second parallel string 315b, and a fifth light emitting module 316e and a sixth light emitting module 316f in a third parallel string 315c. In some examples, the light emitting modules of the light emitting arrays 310a to 310e may be arranged in sets of parallel strings such that the power source 320 supplies a uniform electric current to the light emitting modules of the heating device 300.

In some examples, to emit the substantially uniform irradiance towards the target surface 302, each of the light emitting arrays 310a to 310e of the heating device 300 emits a respective array irradiance associated with a calibration profile. For example, the calibration profile may define the energy levels to be emitted by each of the light emitting arrays 310a to 310e. In an example, the energy levels may be represented as a percentage value with respect to the uniform irradiance to be emitted by the heating device 300. Therefore, if the power source 320 supplies a uniform electric current to the light emitting modules of the light emitting arrays 310a to 310e, the energy levels of the light emitting arrays 310a to 310e are a function of the number of light emitting modules. For example, in the heating device 300 represented in FIG. 3, the light emitting modules may emit an output power in the order of 3.7 W when driven at the uniform electric current (for instance, 2.77 A). Thus, the first and the fifth light emitting arrays 310a and 310e emit an output power in the order of 22.2 W (6×3.7 W), the second and the fourth light emitting arrays 310b and 310d emit an output power in the order of 55 W (15×3.7 W), and the third light emitting array 310c emits an output power in the order of 44.4 W (12×3.7 W).

Although in the heating device 300 each of the light emitting arrays 310a to 310e comprises three parallel strings, it should be understood that in other examples, the light emitting modules may be arranged in more or fewer strings. Also, as previously mentioned, the power source 320 of the heating device 300 may selectively supply a respective electric current to the light emitting arrays 310a to 310, wherein the respective electric current may be based on the number of parallel strings in which the light emitting modules are arranged for the respective light emitting array. Thus, for example, to supply a uniform electric current to the light emitting modules of the first light emitting array 310a, the power source 320 may have to supply to the first light emitting array 310a an electric current equal to three times the uniform electric current.

Figure 4:
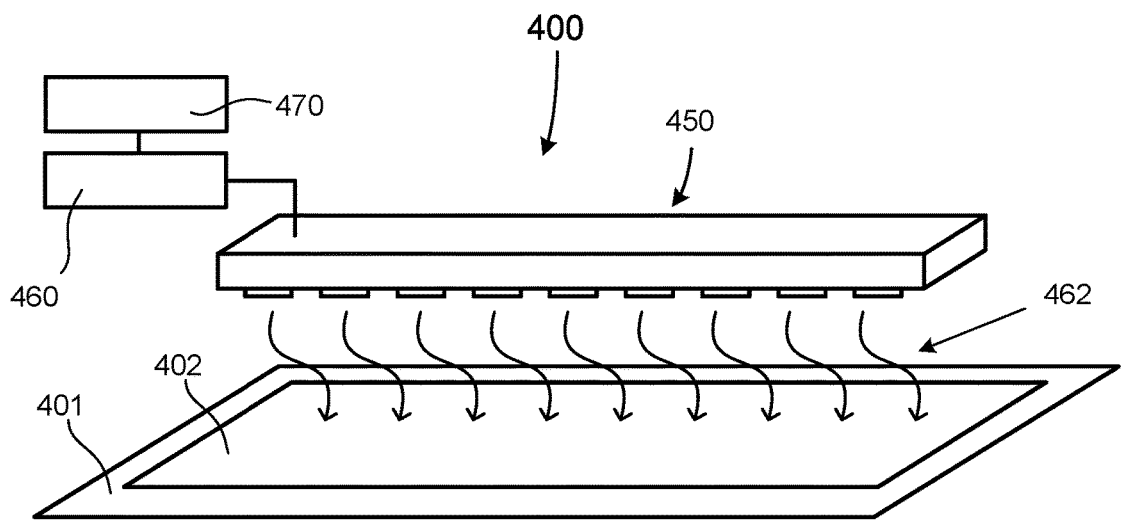
FIG. 4 shows a three-dimensional printing system comprising a heating device, according to an example of the present disclosure.

Referring now to FIG. 4, a three-dimensional printing system 400 comprising a build chamber 401, a heating device 450, and a controller 470 is shown. The build chamber 401 is to receive a powder bed 402 that, when present, forms a base of the build chamber 401. The heating device 450 is to emit a uniform irradiance profile 462 towards the powder bed 402. In some examples, the heating device 450 may be used to selectively solidify a portion of the powder bed. In other examples, the heating device 450 may be used to maintain the regions of the powder bed under operating conditions (for instance, at a predetermined temperature). As previously explained, the heating device 450 comprises a plurality of light emitting modules arranged in a plurality of regions and a power source 460 electrically connected to the plurality of light emitting modules. In an example, the heating device 450 may correspond to the heating devices 100 and 300 previously explained in reference to FIGS. 1A-1B and 3.

In the three-dimensional printing system 400 of FIG. 4, each region of the plurality of regions comprises a number of light emitting modules based on a contribution of the region to the uniform irradiance profile 462. In an example, the contributions of each of the regions may be defined by a calibration profile. Also, as previously explained with reference to FIG. 3, the light emitting modules of each of the regions may be arranged in a respective set of parallel strings having a respective common voltage drop value. In this way, the light emitting modules belonging to a region will experience a uniform degradation over their lifespan.

To supply electric power to the light emitting modules, the power source 460 is electrically connected to each of the sets of parallel strings. In an example, the power source 460 may correspond to an electric current power source. To control the irradiance emitted by the heating device 450, the controller 470 controls the power source 460 to selectively supply a respective electric current to each set of parallel strings. In particular, to emit the uniform irradiance profile 462 towards the powder bed 402, the controller 470 is to control the power source 460 to selectively supply a respective electric current to each set of parallel strings based on a number of parallel strings of the region, the contribution of the respective region to the uniform irradiance profile 462, and the respective common voltage drop value for the region.

In some examples, the degradation of the light emitting modules may be modeled as lifespan data. In particular, the lifespan data may model an efficiency decrease of the light emitting modules over their lifespan. As explained above, in some examples the light emitting modules belonging to the same region may age uniformly. In some other examples, all the light modules of the heating device 450 may age uniformly. In an example, the controller 470 may obtain lifespan data associated with the light emitting modules to balance the aging effects associated with the degradation of a region (or multiple regions). Then, for each region, the controller 470 may determine a respective correction factor based on the lifespan data, the respective electric current supplied by the power source 460, and the respective common voltage drop in each region. Then, based on the correction factors, the controller 470 may control the power source 460 to modify the respective electric currents such that the output losses associated with light emitting module degradation are balanced.

In some other examples, the number of light emitting modules for each region of the heating device 450 of the three-dimensional printing system 400 may be based on an operative electric current of the light emitting modules. In an example, the respective number of light emitting modules in each region may be based on the operative electric current of the light emitting modules, a respective contribution of the region to the uniform irradiance profile 462, and the uniform irradiance profile. Then, to drive the light emitting modules at the operative electric current, the controller 470 controls the power source 460 to selectively supply to each set of parallel lines a respective electric current based on the operative electric current and a number of parallel lines for the region. In an example, a region of the heating device 450 may comprise ninety light emitting modules distributed in six parallel lines and the operative electric current for the light emitting modules may be about 3 A. Thus, to effectively drive the light emitting modules of the region, the power source may have to supply the set of parallel lines a respective electric current in the order of 18 A.

In further examples, the three-dimensional printing system 400 may further comprise a carriage movable across the build chamber 401 in a transverse direction. In an example, the plurality of regions of the heating device may be distributed across a longitudinal direction of the carriage and the controller 470 may control the carriage to move the heating device across the build chamber 401. In some examples, the carriage may comprise a set of printheads to dispense print agent(s) to the powder bed 402.

Figure 5:
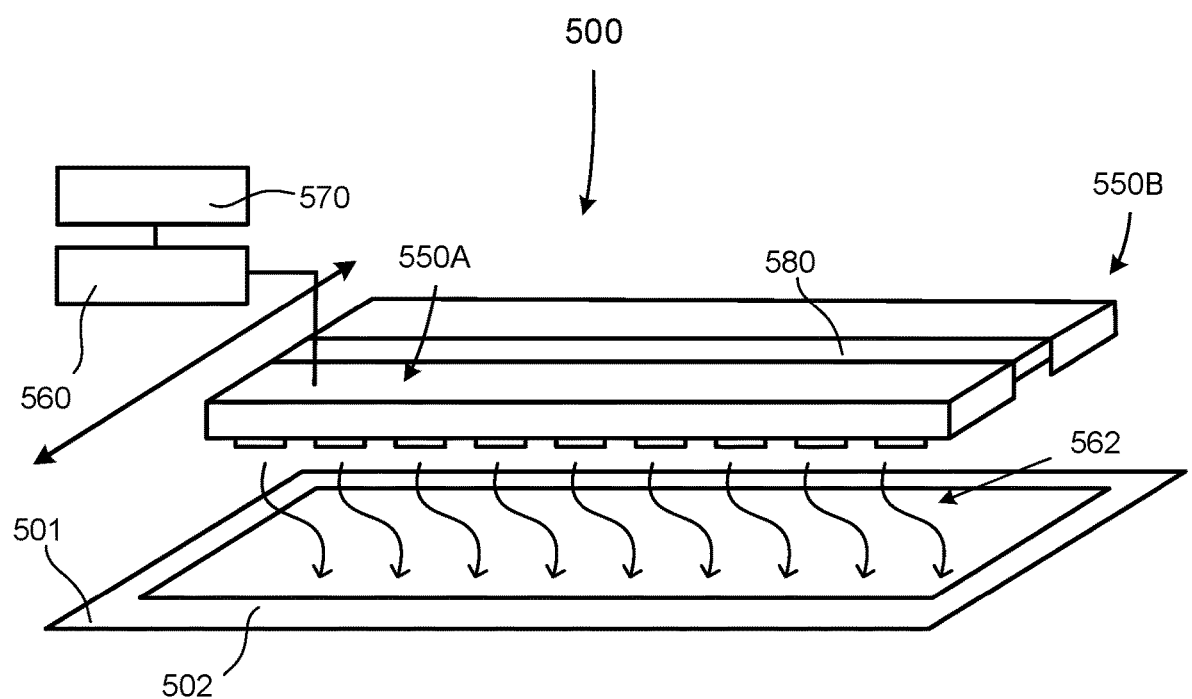
FIG. 5 shows a three-dimensional printing system comprising a heating device and a carriage, according to an example of the present disclosure.

Referring now to FIG. 5, a three-dimensional printing system 500 comprising a first heating device 550A, a second heating device 550B, a carriage 580, and a build chamber 501 is shown. In particular, the carriage 580 is positioned between the heating devices 550A and 550B. The build chamber 501 of the three-dimensional printing system 500 is to receive a powder bed 502 that, when present, forms a base of the build chamber 501. In use, the first heating device 550A and the second heating device 550B of the system 500 emit a uniform irradiance profile 562 towards the powder bed 502. Each of the heating devices may correspond to the heating devices previously explained in reference FIGS. 1A, 1B, 3, and 4.

In the system 500 of FIG. 5, the carriage 580 is movable in a transverse direction across the build chamber 501. On the other hand, the plurality of light emitting modules of the heating devices 550A and 550B are distributed across a longitudinal direction of the carriage 580. Thus, when the powder bed 502 is present, the uniform irradiance profile 562 emitted by the heating devices is received by regions of the powder bed 502 distributed along a width of the powder bed 502 (i.e., a short axis of the build chamber 501) while the carriage 580 is moving along a length of the build chamber 501 (i.e., a long axis of the build chamber 501). As a result, the irradiance profile 562 is received by other regions distributed along the length of the build chamber 501.

In an example, the controller 570 is further to control the carriage 580 to move across the build chamber 501. In some other examples, the carriage 580 may further comprise a set of printheads to dispense printing fluid to the powder bed 502.

In some examples, the carriage 580 may further comprise a plurality of printheads distributed along the longitudinal direction of the carriage 580 such that the plurality of printheads spans a width of the powder bed 502. In some examples, the controller 570 may control the power source 560 to supply electric currents to the set of parallel strings of the heating devices 550A and 550B during a printing fluid dispensing operation in which the printheads dispense printing fluid on the powder bed. In this way, the printhead(s) of the carriage 580 may dispense printing fluid on regions irradiated by the heating devices 550A and 550B.

Although the system 500 of FIG. 5 includes the heating devices 550A and 550B, in other examples, the heating devices 550A and 550B may be replaced with a single heating device having the light emitting modules at both sides of a carriage may be used.

According to an example, heating devices 550A and 550B may comprise a plurality of light emitting arrays arranged to emit a substantially uniform irradiance profile towards a target surface 501 and a power source 560 electrically connected to the plurality of light emitting arrays. Each light emitting array of the plurality of light emitting arrays may comprise a number of light emitting modules arranged based on a contribution of the light emitting array to the substantially uniform irradiance profile. To emit the substantially uniform irradiance profile towards the target surface, the power source 560 is to supply a respective electric current to each light emitting array based on the number of light emitting modules of the light emitting array, an operative electric current of the light emitting modules, and a distribution of the light emitting modules within the light emitting array. In an example, the number of light emitting modules of each light emitting array may be arranged so that the respective electric current supplied by the power source 560 splits such that the light emitting modules are each driven with equal electric current. In some examples, the number of light emitting modules across the plurality of light emitting arrays used to emit a substantially uniform irradiance profile is non-uniform.

According to other examples, the power source 560 may supply a respective electric current to each of the light emitting arrays based on a light emitting array uptime. In some examples, the respective electric currents supplied by the power source 560 to each of the light emitting arrays may be based on the number of light emitting modules of the light emitting array, the operative electric current of the light emitting modules, the distribution of the light emitting modules within the light emitting array, and uptime of the light emitting arrays. In an example, the operative electric current may correspond to an electric current associated with the highest efficiency for the light emitting modules.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A three-dimensional printing system comprising:
   a build chamber to receive a powder bed that, when present, forms a base of the build chamber;
   a heating device to emit a uniform irradiance profile towards the powder bed, the heating device comprising:
   a plurality of light emitting modules arranged in a plurality of regions, wherein each region comprises a number of light emitting modules based on a contribution of the region to the uniform irradiance profile, wherein for each region, the light emitting modules are arranged in a respective set of parallel strings having a respective common voltage drop value, and
   a power source electrically connected to the sets of parallel strings; and
   a controller to control the power source to selectively supply a respective electric current to each set of parallel strings based on a number of parallel strings of the region, the contribution of the respective region to the uniform irradiance profile, and the respective common voltage drop value for the region.

2. The three-dimensional printing system of claim 1, the system further comprising a carriage movable in a transverse direction across the build chamber, wherein:
   the plurality of regions of the heating device is distributed across a longitudinal direction of the carriage, and
   the controller controls the carriage to move across the build chamber.

3. The three-dimensional printing system of claim 2, wherein:
   the carriage further comprises a plurality of printheads distributed along the longitudinal direction of the carriage, and
   the controller is to control the printheads to dispense printing fluid on the powder bed.

4. The three-dimensional printing system of claim 1, wherein:
   for each zone, the number of light emitting modules is arranged in a set of parallel lines having a common voltage drop.

5. The three-dimensional printing system of claim 4, wherein:
   the respective number of light emitting modules in each region is based on an operative electric current of the light emitting modules, a respective contribution of the region to the uniform irradiance profile, and the uniform irradiance profile, and
   the controller is to selectively supply to each set of parallel lines a respective electric current based on the operative electric current and a number of parallel lines for the region.

6. The three-dimensional printing system of claim 5, wherein the controller is further to:
   obtain lifespan data associated with the light emitting modules,
   for each region, determine a respective correction factor based on the lifespan data, the respective electric currents in each of the zones, and the number of respective voltage drop, and
   based on the correction factors, control the power source to modify the respective electric currents.

7. A method for operating a three-dimensional printing system, comprising:
   operating a build chamber that receives a powder bed that, when present, forms a base of the build chamber;
   operating a heating device that emits a uniform irradiance profile towards the powder bed,
   wherein operating the heating device comprises:
   arranging a plurality of light emitting modules in a plurality of regions, wherein each region comprises a number of light emitting modules based on a contribution of the region to the uniform irradiance profile, wherein for each region, arranging the light emitting modules in a respective set of parallel strings having a respective common voltage drop value, and
   connecting a power source electrically to the sets of parallel strings; and
   controlling, by a controller, the power source to selectively supply a respective electric current to each set of parallel strings based on a number of parallel strings of the region, the contribution of the respective region to the uniform irradiance profile, and the respective common voltage drop value for the region.

8. The method of claim 7, further comprising:

moving a carriage in a transverse direction across the build chamber;

distributing the plurality of regions of the heating device across a longitudinal direction of the carriage, and controlling, by the controller, the carriage to move across the build chamber.

9. The method of claim 8, further comprising:

distributing a plurality of printheads along the longitudinal direction of the carriage, and controlling, by the controller, the printheads to dispense printing fluid on the powder bed.

10. The method of claim 7, further comprising:

for each zone, arranging the number of light emitting modules in a set of parallel lines having a common voltage drop.

11. The method of claim 10, further comprising:

establishing the respective number of light emitting modules in each region from an operative electric current of the light emitting modules, a respective contribution of the region to the uniform irradiance profile, and the uniform irradiance profile, and selectively supplying, by the controller, to each set of parallel lines a respective electric current based on the operative electric current and a number of parallel lines for the region.

12. The method of claim 11, wherein the controller further comprises:

obtaining lifespan data associated with the light emitting modules;

for each region, determining a respective correction factor based on the lifespan data, the respective electric currents in each of the zones, and the number of respective voltage drop, and based on the correction factors, controlling the power source to modify the respective electric currents.

* * * * *